US007824720B2

(12) United States Patent
Unwin

(10) Patent No.: US 7,824,720 B2
(45) Date of Patent: **\*Nov. 2, 2010**

(54) FOOD HEATING CONTAINER

(75) Inventor: Guy Darrell Unwin, Tewkesbury (GB)

(73) Assignee: Planit Products Limited, Malvern (GB)

( * ) Notice: Subject to any disclaimer, the term of this patent is extended or adjusted under 35 U.S.C. 154(b) by 1126 days.

This patent is subject to a terminal disclaimer.

(21) Appl. No.: 11/152,001

(22) Filed: Jun. 14, 2005

(65) Prior Publication Data

US 2005/0233034 A1    Oct. 20, 2005

Related U.S. Application Data

(62) Division of application No. 10/398,706, filed as application No. PCT/GB00/02409 on Jun. 22, 2000, now Pat. No. 7,001,628.

(30) Foreign Application Priority Data

Jun. 24, 1999   (GB)   ................................. 9914695.3
May 4, 2000    (GB)   ................................. 0010801.9

(51) Int. Cl.
*B65D 81/34*   (2006.01)
(52) U.S. Cl. ...................... 426/113; 426/126; 383/116; 383/117; 383/119; 220/573.2
(58) Field of Classification Search ................ 426/106, 426/107, 112–114, 126, 523; 383/109, 110, 383/116, 117, 119; 220/573.1–573.3; 219/400
See application file for complete search history.

(56) References Cited

U.S. PATENT DOCUMENTS

| 2,323,623 | A | * | 7/1943 | Porter et al. ................... 99/403 |
| 2,609,301 | A | * | 9/1952 | Lindsey ....................... 426/105 |
| 2,807,550 | A | * | 9/1957 | Zarotschenzeff et al. .... 426/113 |
| 2,834,404 | A | * | 5/1958 | Groome .................. 297/344.12 |
| 2,881,078 | A | * | 4/1959 | Oritt ........................... 426/107 |
| 2,912,336 | A | * | 11/1959 | Perino ......................... 426/107 |
| 3,117,875 | A | * | 1/1964 | Krakauer et al. ............. 426/110 |
| 3,322,319 | A | * | 5/1967 | Stroup et al. ................. 426/106 |
| 3,361,576 | A | * | 1/1968 | Jacobson ..................... 426/107 |
| 3,392,033 | A | * | 7/1968 | Thulin ......................... 426/107 |
| 3,410,700 | A | * | 11/1968 | Gstohl ......................... 426/107 |
| 3,415,662 | A | * | 12/1968 | Koger et al. ................. 426/113 |
| 3,439,865 | A | * | 4/1969 | Port et al. .................... 383/117 |
| 3,554,770 | A |   | 1/1971 | Lipsky et al. .................. 99/174 |
| 3,585,048 | A | * | 6/1971 | Uhlig ........................... 426/124 |
| 3,615,711 | A | * | 10/1971 | Markus et al. .............. 426/110 |
| 3,623,630 | A | * | 11/1971 | Rode ........................ 220/573.1 |
| 3,663,239 | A | * | 5/1972 | Rowe et al. .................. 426/113 |

(Continued)

FOREIGN PATENT DOCUMENTS

EP    0 240 071    10/1987

(Continued)

*Primary Examiner*—Drew E Becker
(74) *Attorney, Agent, or Firm*—Heslin Rothenberg Farley & Mesiti P.C.

(57) ABSTRACT

Container for heating food in an electrical bread toaster or other radiant heating device comprises a closed or partially open pouch formed of flexible sheet material comprising a woven fabric, such as glass or KEVLAR fibers, coated or impregnated with an electrically non-conductive heat resistant material, for example PTFE.

16 Claims, 2 Drawing Sheets

U.S. PATENT DOCUMENTS

| | | | | |
|---|---|---|---|---|
| 3,741,778 | A * | 6/1973 | Rowe | 426/107 |
| T0,914,010 | I4 * | 9/1973 | Hamilton | 426/107 |
| 3,759,721 | A * | 9/1973 | Hawley | 426/509 |
| 3,836,064 | A * | 9/1974 | Stillwagon | 426/113 |
| 3,873,735 | A * | 3/1975 | Chalin et al. | 426/87 |
| 3,891,775 | A | 6/1975 | Murray | 426/107 |
| 4,051,266 | A * | 9/1977 | Goltsos | 426/120 |
| 4,942,809 | A * | 7/1990 | Simmons | 99/426 |
| 4,984,907 | A * | 1/1991 | Power | 383/109 |
| 5,075,526 | A * | 12/1991 | Sklenak et al. | 219/730 |
| 5,310,587 | A * | 5/1994 | Akahori et al. | 428/35.2 |
| 5,853,781 | A * | 12/1998 | Bono et al. | 426/110 |
| 6,332,713 | B1 * | 12/2001 | Cohen | 383/75 |
| 7,364,762 | B2 * | 4/2008 | Unwin | 426/107 |
| 2008/0069485 | A1 * | 3/2008 | France et al. | 383/117 |
| 2008/0087268 | A1 * | 4/2008 | Burton | 126/9 R |
| 2010/0021090 | A1 * | 1/2010 | Wilske | 383/42 |

FOREIGN PATENT DOCUMENTS

| | | |
|---|---|---|
| EP | 0 903 099 | 3/1999 |
| GB | 1 374 937 | 11/1974 |

* cited by examiner

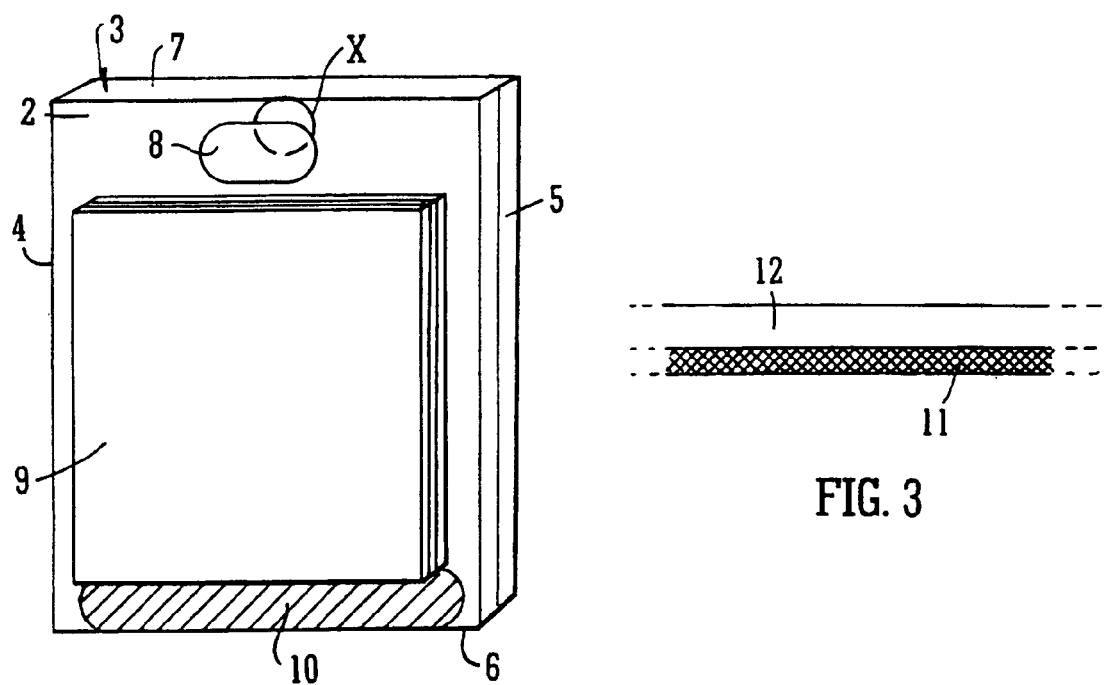
FIG. 2
FIG. 3
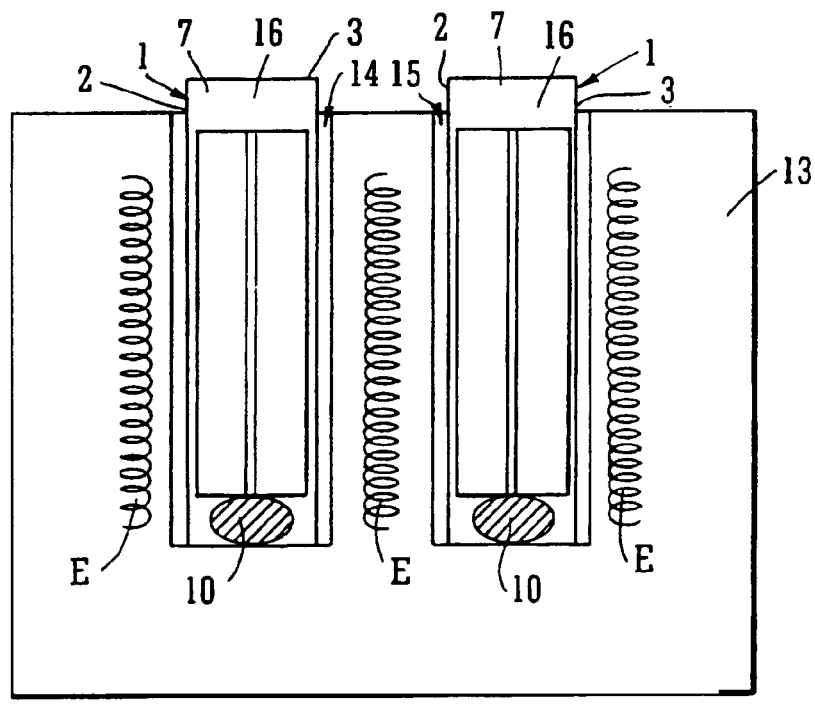
FIG. 4

FOOD HEATING CONTAINER

CROSS REFERENCE TO RELATED APPLICATIONS

This application is a divisional application of U.S. application Ser. No. 10/398,706 filed on Apr. 7, 2003, now U.S. Pat. No. 7,001,628, which is a national stage filing under 35 U.S.C. 371 of PCT application PCT/GB00/02409 filed Jun. 22, 2000, which claims priority from British application GB 9914695.3 filed Jun. 24, 1999 and from British application 0010801.9 filed May 4, 2000. The entire disclosures of these applications are incorporated herein by reference.

The invention relates to a container to hold food to be heated in a toaster.

A conventional toaster, with one or more upright slots and banks of radiant heaters located at either side of each toaster slot, provides rapid heating of bread and has also been used for other food items such as waffles, crumpets etc. It is known to heat food in metal foil packages in a toaster although such packages require perforation in order to cook adequately due to the impermeability of the metal foil. Such perforations are required in order that the radiant heat may enter the package and that steam produced by the heating process is allowed to exit, without which the food will not brown.

Other techniques involve metal racks, grilles, or mesh arrangements which are inserted into the toaster to hold a whole sandwich or other food together. Apart from being cumbersome, these all involve the introduction of metal objects by hand into the toaster where lethal voltages are present. There is also the problem of containment of any excess moisture from non-bread foods that will tend to drip out of the container into the toaster where it is difficult to clean.

It is one object of this invention to provide an improved container for heating food in an energised toaster.

According to the present invention in one aspect there is provided a container for heating food in a toaster, the container comprising two facing walls sealed along three edges to define a pouch having an open mouth, the walls being formed of two layers, one outside the other, the outer layer comprising an electrically non-conductive and heat resistant material, and the inner layer being a woven fabric having sufficient thermal conductivity to heat, in use, food contained in the pouch when in an energised toaster.

According to a second aspect there is provided A container for heating food in a radiant heat generating device, the container including at least one wall for receiving said radiant, heat and made of a woven fabric coated and/or impregnated with an electrically non-conductive and heat resistant material, the wall having sufficient thermal conductivity to transmit said heat to food contained in the container.

It is preferred that the outer layer is polytetrafluoroethylene (PTFE) or tetrafluoroethylene (TEFLON®). It is also preferred that the inner layer is a weave of glass or poly(p-phenyleneterepthalamide) (KEVLAR®) strands. However, other materials suitable for this purpose are not excluded.

It is preferred that the container has at least one tab or handle for removing the container from the toaster.

Preferably fluid-absorbing means are present inside the container, having hydrophilic and lipophilic properties to absorb excess moisture of fats produced by the food during heating. Such means may be attached or loosely placed within the container at its base.

Different means may be provided in order to alter the thermal conductivity of the container material. This may be necessary in circumstances where it is necessary to cook the centre of an article thoroughly, as generally the outer surface of the food cooks more quickly. The inside of the container preferably has a reflective external coating or layer of metal foil or wire. However, it is within the scope of the invention to alter the thermal conductivity of the container by varying the pigment colour of the material; for instance a white pigment will retard the heating process and a black pigment will aid the transfer of heat to the interior of the container.

The container is sized so as to fit into a slot of a toaster, and is of sufficient height to allow an adequate proportion of the container to project above the top of the toaster body in use, such that the user will not feel the heat of the container when removing it from the toaster. However, in practice removal of the container is not a problem due to the excellent thermal properties of the container material, which is cool enough to touch within seconds of ejection form the toaster.

According to the invention in another aspect there is provided a method of heating food in a toaster by adding food to a container comprising two facing walls sealed along three edges to define a pouch having an open mouth, the walls being formed of two layers, one outside the other, the outer layer comprising an electrically non-conductive and heat resistant material, and the inner layer being a woven fabric having sufficient thermal conductivity to heat, in use, food contained in the pouch when in an energised toaster; the method comprising inserting the container into the slot of a toaster, energising the toaster for a sufficient time period for the food to be heated, and then removing the container from the toaster.

It may be desirable to seal the pouch on all sides to contain a variety of foods for storage prior to sale, in order to form a range of convenience foods. The pouch may be provided with means for manual opening such as a draw string or tear strip provided on one or more sides, ideally at the top of the pouch as supported in the toaster. Such a range of convenience foods would be ideal for sale at garages, pubs and the like; where instant heating is paramount.

The invention will now be described by way of example only with reference to the accompanying diagrammatic drawings, in which:

FIG. 2 is a perspective view of another container of the invention;

FIG. 3 is an enlarged view of a portion of the edge of one side wall of the container of FIG. 2, labelled X in FIG. 1;

FIG. 4 is a cross section through a toaster housing the FIG. 2 container.

Figure 1:
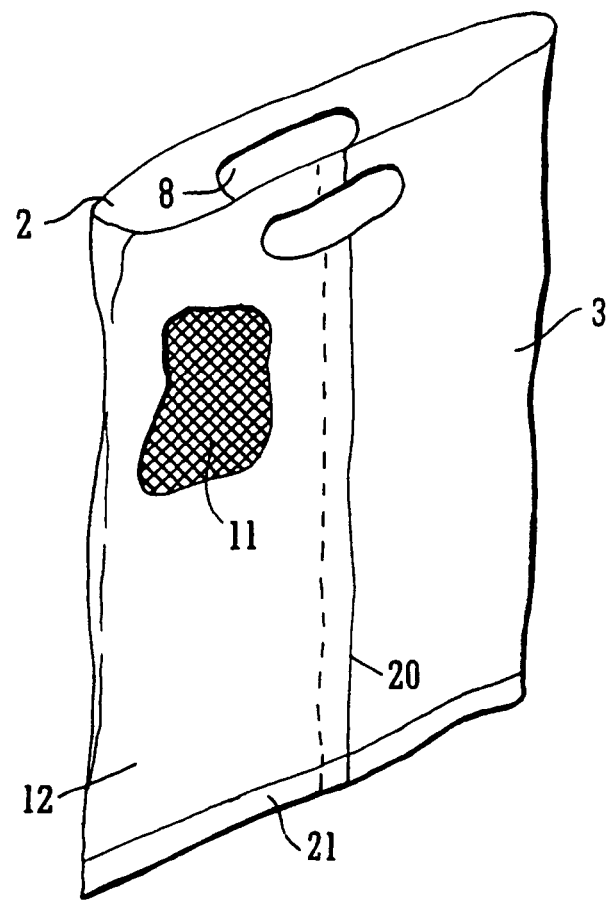
FIG. 1 is a perspective view of one container of the invention.

One container of FIG. 1 is made from a sheet of material comprising woven glass or KEVLAR fibre 11 is sprayed with pigmented PTFE on both sides to form outer layers 12—the woven base material 11 cannot be seen in the actual product—a portion of one of the layers 12 is removed in FIG. 2 for illustration purposes. The sheet is folded at two opposite edges and welded at a central seam 20 and a lower edge to form a pouch with two facing opposite walls 2 and 3. A slotted hole is provided at the top of each wall 2 and 3.

A sandwich, beans, bacon or even scrambled egg mix may be placed in the pouch and the pouch then placed in the bread slot of an electrical bread toaster. The radiant heat from the toaster elements then cooks or heats the contents of the pouch.

The holes 8 form handles for retrieving the pouch from the toaster. The container 1 of FIG. 2 again comprises two facing walls 2,3 which are joined along three edges 4,5,6 to define a pouch, having one edge open to form a mouth 7. Below the mouth 7 of the container 1 aligned holes are formed (only one of which is visible) in both facing walls 2,3 to form a handle 8 for removal of the container 1 from a toaster. The food to be cooked is placed in the container 1. In this case, the container 1 is accommodating a cheese sandwich 9 to be toasted. Fluid absorbing material 10 is located in the bottom of the pouch to draw excess moisture and fats away from the sandwich 9 allowing it to brown.

For both FIGS. 1 and 2, the facing walls 2,3 of the container 1 are made up of two layers 11,12. The inner layer 11 is a woven material containing strands of a material with high thermal conductivity such as KEVLAR® (poly(p-phenyleneterepthalamide). The outer layer 12 is a coating of an electrically non-conductive and heat resistant material such as TEFLON (tetrafluoroethylene). A suitable KEVLAR® reinforced TEFLON® coated material is available commercially under the trade mark TYGAFLOR and is produced by Tygaflor Ltd.

The container 1 is generally formed from single sheet of material, by folding a strip in half and sealing the ends using heat and pressure to form a tube, and then securing one end of the tube to form a pouch.

FIG. 4 shows a cross-section of a typical toaster 13 of the parallel type having two slots 14,15 and three heating elements E. A container 1 of the invention containing a sandwich 9 is seated in each of the two slots 14,15. The height of the container 1 is such that when placed into the toaster 13 the top of the facing walls 2,3 of the container 1 project from the top of the toaster body 13, providing a cool portion 16 of the container 1 to aid removal from the toaster 13 once the food 9 is cooked. The toaster is energised in the usual way, until the food is heated.

Instead of an electric bread toaster, the container of FIG. 1 or 2 may be heated in alternative radiant heating apparatus, for example a grill or microwave oven of the kind having a combined radiant heater (not shown).

The invention is not limited to the embodiment shown. For example, other materials may be used to produce the container 1; all four edges 4,5,6,7 may be sealed and a tear strip or other means may be provided for opening the container; alternative handle or tab arrangements may be used; the edges may be folded prior to sealing to reduce the risk of leakage; one or more of the edges may be fixed using a clip or clamp; and the corners of the container may be radiused to permit more effective cleaning. The container may also be manufactured from two separate sheets of material forming the front and back facing walls 2,3. The material of the container 1 is flexible enough to allow the container to be turned inside out for easy cleaning either by hand or by placing over a plate prong in a dishwasher. However, it is within the scope of the invention to use a more rigid material to make the container suitable for certain uses, for example, for point of sale display of a pre-packed convenience food designed for single use and disposal.

To achieve optimum heating characteristics, the container walls could comprise PTFE which is pigmented or aluminised or a metallic foil or mesh could be incorporated (not shown).

Figure 5:
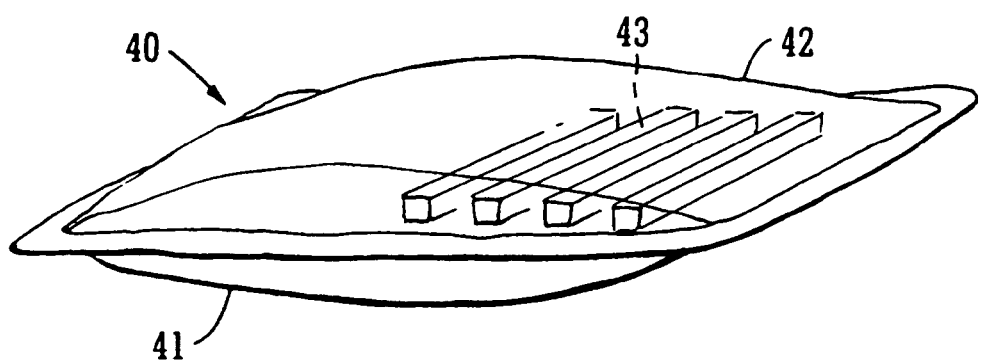
FIG. 5 is a perspective view of another container.

The embodiment of FIG. 5 comprises a pouch 40 comprising two flexible walls 41 and 42 sealed all round the periphery of the pouch, for example, by welding or by having a weldable tape (not shown) attached between the peripheral portions of the walls 41 and 42. The tape may be made of PFA. A portion of food 43 (for example, french fries) is enclosed in the pouch 40. The walls 41 and 42 are made of glass mesh impregnated with PTFE (by being sprayed onto the mesh). The walls are of relatively low thickness (for example with a gauge of less than 150 gm per square meter, or less than 100 or better less than 80, or even about 60 to 65 grams per square meter so that they are porous to steam emitted by the food in the pouch when heated, i.e. so they are gas permeable but do not let out appreciable liquid.

The walls 41 and 42 could be perforated to improve porosity. To hermetically seal or at least keep reasonably airtight, the food within the container 40, the latter could be supplied sealed inside an outer bag which is removed prior to heating.

In all the embodiments, the container walls could be connected together by a means other than welding, for example by stitching or by a clip or clamp device (not shown)

The invention claimed is:

1. A re-usable container for heating food in a radiant heat generating device, the container comprising two facing walls closed along three edges of the facing walls defining a pouch between the facing walls and a fourth edge of each of the facing walls providing an open mouth for insertion by a user of food to be heated, wherein each of the walls is formed from a sheet of material comprising a layer of woven fabric material and PTFE, the sheet of material being impermeable to liquid.

2. A container according to claim 1, further comprising fluid-absorbing means inside the container, the fluid absorbing means having at least one of hydrophilic and lipophilic properties to absorb at least one of excess moisture and fat produced by the food during heating.

3. A container according to claim 1, wherein the single sheet of material comprises a tear-resistant material.

4. A container according to claim 1, wherein the single sheet of material consisting essentially of the woven fabric material and PTFE.

5. A container according to claim 1, wherein the re-usable container can be cleaned for re-use.

6. A container according to claim 1, wherein the re-usable container is dishwasher safe.

7. A container according to claim 1, wherein the re-usable container comprises a container into which a first food can be inserted, in which the first food is heated, from which the heated first food is removed, can then be washed, and then the container can be re-filled with a second food to be heated.

8. A container according to claim 1, wherein the woven fabric is one of impregnated with said PTFE and coated with said PTFE.

9. The container as recited in claim 8, wherein the woven fabric is coated with said PTFE, and wherein the woven fabric is spray coated with said PTFE.

10. A container according to claim 1, wherein the woven fabric comprises a weave of strands made of one of glass and poly(p-phenyleneterepthalamide).

11. A container according to claim 1, wherein the container comprises at least one portion adapted to be held during removal of the container from the device.

12. A container according to claim 11, wherein said at least one portion comprises a portion of said wall shaped to define a holding tab.

13. A container according to claim 1, wherein the container further comprises a reflective metallic external flexible layer.

14. A container according to claim 13, wherein said reflective metallic flexible layer comprises metal foil.

15. A container according to claim 13, wherein said reflective metallic flexible layer comprises metal mesh.

16. A container according to claim 1, wherein said single sheet of material is adapted to withstand heat of an electric toaster without damage.

* * * * *